United States Patent

[19]

Otty

[11] 4,229,242

[45] Oct. 21, 1980

[54] METHOD AND APPARATUS FOR PRESSING AND CURING RESIN-IMPREGNATED WRAPPINGS ABOUT COILS

[76] Inventor: Malcolm Otty, Westering, Mill Hay Rd., Caldy, Merseyside, England

[21] Appl. No.: 911,230

[22] Filed: May 31, 1978

[30] Foreign Application Priority Data

Jun. 1, 1977 [GB] United Kingdom ............... 23879/77

[51] Int. Cl.[2] ..................... B29C 27/00; B32B 31/14
[52] U.S. Cl. .................................. 156/245; 156/500;
264/40.5; 264/40.6; 264/137; 264/258;
264/272; 264/DIG. 46; 425/143; 425/149;
425/233; 425/383; 425/406; 425/446;
425/DIG. 7
[58] Field of Search ............. 264/248, 272, 320, 322,
264/137, 258, 40.5, 40.6, DIG. 46; 156/51, 242,
245, 185, 194, 196, 443, 583, 53–56, 500;
29/596, 605; 100/233, 236, 264; 425/143, 149,
DIG. 7, 233, 383, 406, 445; 242/7.03, 7.04, 7.08,
7.19

[56] References Cited

U.S. PATENT DOCUMENTS

| 2,400,008 | 5/1946 | Korte | 29/605 |
| 2,601,243 | 6/1952 | Botts et al. | 156/185 |
| 2,656,290 | 10/1953 | Berberich et al. | 29/605 |
| 2,675,421 | 4/1954 | Dexter | 264/272 |
| 2,783,171 | 2/1957 | Thiessen | 156/185 |
| 2,922,734 | 1/1960 | Kohn et al. | 264/272 |
| 2,979,432 | 4/1961 | Thiessen | 156/53 |
| 3,232,544 | 2/1966 | Caldwell | 156/443 |

*Primary Examiner*—W. E. Hoag
*Attorney, Agent, or Firm*—Oblon, Fisher, Spivak, McClelland & Maier

[57] ABSTRACT

The wrapped insulation of coils of large electric machines—motors or generators—is set by heat and pressure in a press that extends the length of both wrapped legs of the coil and supports the coil so that it is substantially free from stress. The coil may be supported with its wrapped legs level and horizontal, and the press can be adjustable for different coil sizes and configurations. The heat and pressure cycle is operable automatically to suit the requirements of the insulating material.

13 Claims, 4 Drawing Figures

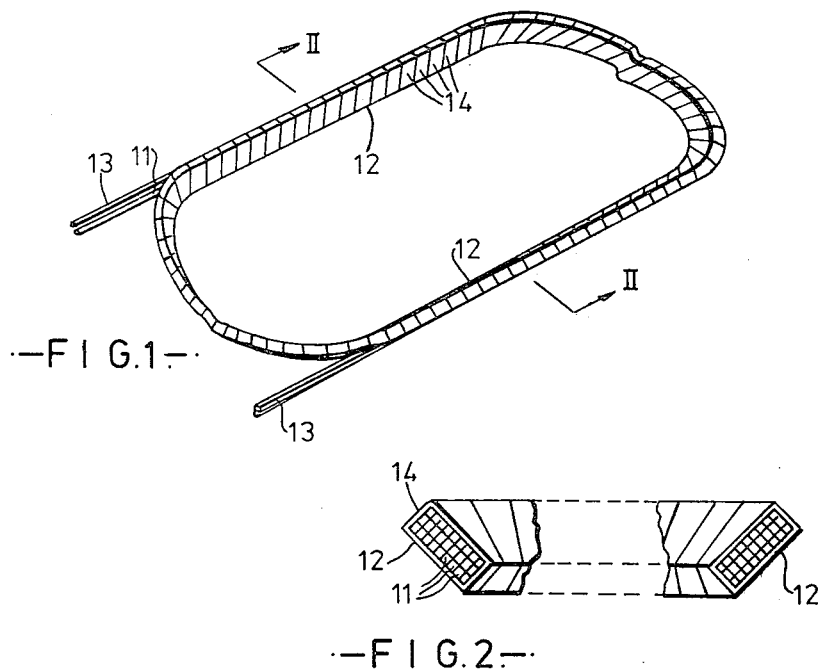
FIG.1.
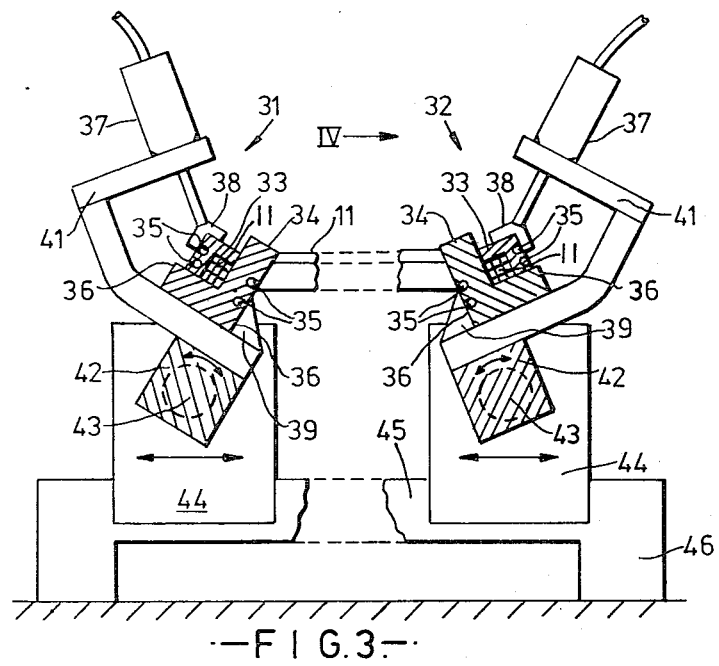
FIG.2.
FIG.3.

METHOD AND APPARATUS FOR PRESSING AND CURING RESIN-IMPREGNATED WRAPPINGS ABOUT COILS

BACKGROUND OF THE INVENTION

1. Field of the Invention

This invention relates to coil presses for setting the wrapped insulation of a coil for a large electric machine such as a generator or motor. Such a coil (referred to hereinafter as "a coil of the type described") comprises a loop of copper or other good conductor having parallel straight legs which fit into slots in the rotor or stator or like part of the electric machine. The cross section of the material of the loop is usually rectangular. A typical loop may have its straight legs there or four feet long and separated by two or three feet, but of course the size of the loop depends on the size of the electric machine, which can be anything from a motor of one or a few horsepower to a generator for a power station. A typical cross section of the coil material is one inch by a quarter inch (which may be solid or assembled from a number of wires) although this too varies according to the size, type and rating of the electric machine.

2. Description of the Prior Art

The conductive material of the coil has of course to be electrically insulated prior to assembly in the electric machine. This has in the past been done by wrapping it with mica strip, but more recently thermoplastic or thermosetting resin-impregnated tape has been used. This tape is wound helically around the coil, at least over the straight legs thereof which fit into the rotor or stator slots. At least the wrapped tape on the straight legs is then subjected to heat and pressure, which plasticises and consolidates the resin so as to impart a hard smooth surface thereto and to bond the layers of tape together and to delimit the cross-sectional dimensions thereof so as to conform to the dimensions of the slot of the electric machine.

Although the characteristics of the new resin-impregnated tapes are quite different from those of the old mica type, no special machinery has been available for setting them on the coils, and the same methods as were used for the mica strips are still in use. It has been found, however, that these old methods and old machinery have certain disadvantages when used with the new tapes. In the old methods and old apparatus, for example, the coil was put one leg at a time into a press. It has been found that, with the new resin-impregnated tapes, small but important distortions can occur as a result of the greater tendency of the resin to flow under heat and pressure, the precise nature of which distortions depends upon the way the rest of the coil is supported by the part of it held in the press. This can lead to inaccuracies in the way the coil fits into the rotor or stator slot, which in turn can lead to undesirable machanical stresses otherwise known as bending stresses in the coils or inefficient performance of the machine.

SUMMARY OF THE INVENTION

The present invention provides a method and apparatus for setting the wrapped insulation of a coil of the type described which avoids the above-mentioned disadvantage and which moreover reduces the time and cost of processing the wrapped coils.

The invention comprises a method for setting the wrapped insulation of a coil of the type described comprising supporting the coil substantially free from stress in press means extending the length of both wrapped legs of the coil and subjecting said wrapped legs to heat and pressure in said press means.

The pressure and/or the heat may be varied during the setting according to an appropriate specification or time-cycle for the insulation material, and the heat and pressure may be automatically controlled.

The legs may be supported substantially horizontally and substantially level with each other during said setting.

The heating may be by electric resistance heating, and the pressure may be applied pneumatically or hydraulically.

The invention also comprises apparatus for setting the wrapped insulation of a coil of the type described comprising double sided press means adapted to support the coil substantially free from stress along the length of both wrapped legs and to subject said wrapped legs to heat and pressure.

The two sides of said press means may be level to support the coil substantially horizontally and with its legs substantially level.

Said press means may comprise on each side a pair of co-operating elongate press half-members capable of being urged together to press the wrapped coil legs. At least one of said press half-members may have at least one groove, which preferably extends the whole length thereof, for receiving in electric resistance heating element.

The press half-members may be made of mild steel, and may be made from bar stock by simple machining operations, so that they may be easily produced for any new dimension of coil required to be pressed.

The apparatus preferably comprises pneumatic pressure applying means, and preferably comprises a plurality of piston and cylinder arrangements extending along each side of the press means.

Each side of said press means may comprise a positionally adjustable bed carrying pressure applying means. The beds may be adjustable towards and away from each other, and may also be angularly adjustable. Each said bed may comprise an elongate bed member journalled in a support at each end and lockable against rotation in said supports, said supports being mounted in a stand. Said bed members may have spaced brackets for pressure applying piston in cylinder arrangements. Preferably the brackets are angled and made of resilient metal, and the pistons of the piston in cylinder arrangements supported thereby are directed towards the bed member.

The apparatus may be in combination with automatic control means for controlling the temperature and pressure to which the wrapped coil legs are subjected over a given operating cycle.

The invention also comprises a wrapped coil of the type described of which the insulation has been set by a method or by apparatus as described herein.

BRIEF DESCRIPTION OF THE DRAWINGS

One embodiment of a method and apparatus for setting the wrapped insulation of a coil of the type described according to the invention will now be described with reference to the accompanying drawings in which:

FIG. 1 is a perspective view of a coil of the type described,

FIG. 2 is a section on the line II—II of FIG. 1,

FIG. 3 is a section through a double sided coil press, and

DETAILED DESCRIPTION OF THE PREFERRED EMBODIMENTS

Figure 4:
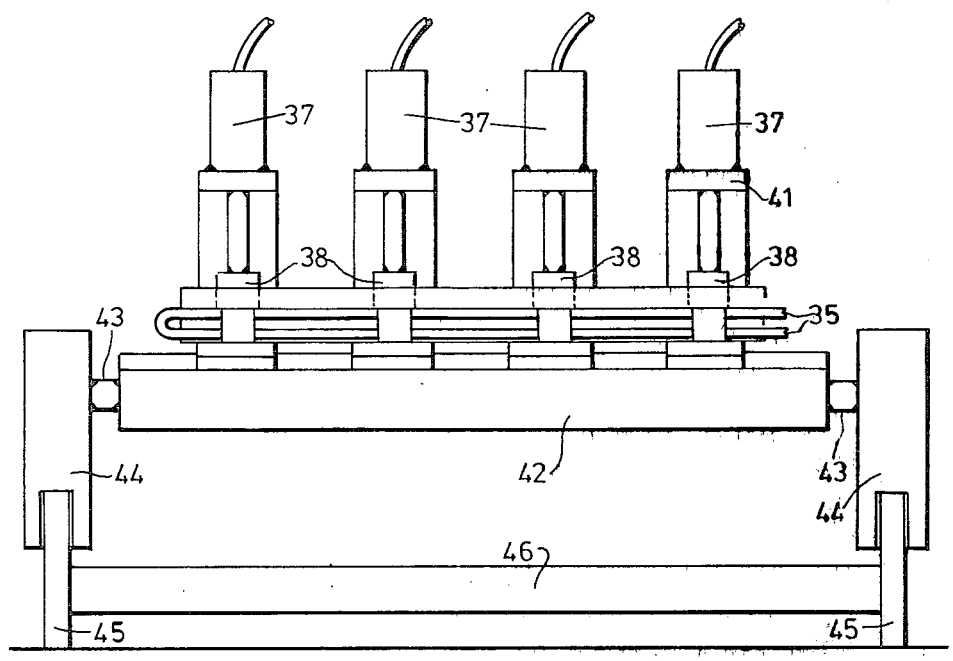
FIG. 4 is a view on the line IV-IB of FIG. 3.

The coil to be pressed, illustrated in FIGS. 1 and 2, comprises an assembly of copper or aluminium wires 11 shaped into a loop having opposed straight legs 12, with exposed ends 13 for connecting the coil in the winding of the electric machine for which it is intended. The winding will comprise a plurality—usually quite a large number—of similar such coils with straight legs fitted into slots in a rotor or stator. The cross section of the assembled wires is usually oblong, as shown in FIG. 2. The straight legs 12 are electrically insulated by being wrapped with a tape 14 which has been impregnated with a thermoplastic or thermosetting resin, and indeed this tape extends all the way round the loop, except for the exposed ends 13.

The wrapping 14 on the straight legs 12 is set by a hot pressing process in the apparatus illustrated in FIGS. 3 and 4. This apparatus comprises double sided press means 31, 32 adapted to support the coil 11 along the length of both wrapped legs 12 and subject them to heat and pressure. The apparatus operates on both wrapped legs at once, taking them through similar pressure and temperature cycles while holding the coil substantially free from stress. The sides 31, 32 of said press means are level to support the coil 11 substantially horizontally and with its legs 12 substantially level.

The press means comprise on each side a pair of corresponding elongate press half-members 33, 34 or mold base members and mold cover members, respetively, capable of being urged together to press the wrapped coil legs 12. Said half-members 33, 34 each have grooves 35 receiving an elongate electric resistance heating element 36. The half-members 33, 34 are made of mild steel, which is easily machined so that specially tailored members can be readily produced for each new coil size and configuration.

The half-members are held in pressure applying means which, as illustrated, comprise a plurality of pneumatic piston in cylinder arrangements 37 extending along each side of the press means. Each piston has a clamp member 38 adapted to hold the corner of the upper press member 34, while the corner of the lower half-member 33 rests in an abutment 39. The pistons are sufficiently retractable to allow the half-members 33, 34 to be assembled and dissembled for the introduction and removal of the coils, and to allow the half-members themselves to be exchanged for others when a new (predetermined) size or configuration of coil is to be pressed. Pressure control means (not shown) are provided capable of giving a light holding pressure to secure the coil in position, but not to exert any substantial pressure on it while the temperature is being raised, and a heavy pressure, once working temperature has been reached. The pressure applying means could equally well, of course, be hydraulic.

The piston in cylinder arrangements and the abutments 39 are mounted on brackets 41 on a positionally adjustable bed 42, one bed being provided for each side of the press. The beds 42 are adjustable towards and away from each other and are also angularly adjustable, as indicated by the arrows on FIG. 3, by being journalled at 43 in supports 44 at each end (and lockable against rotation in said supports), said supports 44 being mounted to run on rails 45 (and lockable in position thereon) in a stand 46.

The brackets 41 are welded to the beds 42 (which are of square cross section) and are slightly angled and slightly resilient, so that they can "give" a little when high pressure is applied.

Automatic control means (not shown) can control the temperature and pressure to which the wrapped legs are subjected over a given operating cycle. A typical cycle would take, say, thirty minutes. The press half-members can first (after adjusting to the right position to receive the coil without stressing it) be warmed up to about 100° C., and the coil inserted and clamped by low air pressure to the pistons. Then the temperature is elevated by the electric resistance heating elements up to, say, 150° C., while the air pressure is increased. After a predetermined time interval, the pressure and temperature are then decreased and held for another period of time before removing the coil from the press. The precise temperatures and times and pressures will depend on the material of the wrapping tape, and will be specified by the manufacturers thereof.

Coils processed as described are characterised by accurate shape and uniformity of insulation over the length of the straight legs.

Obviously, many modifications and variations of the present invention are possible in light of the above teachings. It is therefore to be understood that within the scope of the appended claims the invention may be practiced otherwise than as specifically described herein.

I claim:

1. A method for heat setting a thermosetting resin impregnated in wrappings around a coil having opposed straight leg portions, which comprises:
    adjusting as necessary the relative positions of two separate mold base members adapted to separately support said leg portions;
    disposing said leg portions of said coil in said mold members;
    placing a pair of mold cover members against said leg portions;
    moving fluid actuated clamping means from a position in which the mold members are open for insertion of said core to a clamping position;
    clamping said pair of mold cover members against said leg portions by said clamping means; and
    applying heat and pressure to said coil, thereby bonding said wrappings of said coil around said straight leg portions.

2. A method according to claim 1, which further comprises selectively varying the pressure and temperature during the setting process according to a desired formula for the insulating material concerned.

3. A method according to claim 1, whcih further comprises automatically controlling the pressure and temperature.

4. A method according to claim 1, which further comprises supporting the legs substantially horizontally and substantially level with each other during said setting.

5. A method according to claim 1, wherein said step of applying heat comprises heating by electric resistance heating.

6. A method according to claim 1, wherein said step of applying heat comprises heating by electric resistance heating.

7. An apparatus for heat setting resin impregnated in wrappings around a coil having two opposed straight leg portions comprising:

first and second separate mold base members, each adapted to support one of said straight leg portions, said mold members being relatively movable to accommodate different sized and configured coils;

first and second mold cover members adapted to cooperate with said mold base members;

first and second fluid actuated clamping means, each movable from a first position, in which said mold base members are open to receive one of said straight leg portions, to a second position in which said upper cover members engage said mold members wherein said clamping means engage said mold cover members;

means for applying pressure between said mold cover members and said mold base members; and means for heating said mold members.

8. Apparatus according to claim 7, wherein the sides of said mold base members are level to support the coils substantially horizontally and with said leg portions substantially level.

9. Apparatus according to claim 7, wherein said mold base members and mold cover members include press half-members.

10. Apparatus according to claim 7, wherein the clamping means comprise mild steel.

11. Apparatus according to claim 7, further comprising automatic control means for controlling the temperature and pressure to which the leg portions are subjected over an operating cycle.

12. Apparatus according to claim 9, wherein said half-members are grooved to receive an elongate electric resistance heating element.

13. Apparatus according to claim 9, said mold base members including a positionally adjustable bed carrying the mold base members, the beds being adjustable towards and away from each other and being angularly adjustable, to accommodate said different sized and configured coils.

* * * * *